US010768491B2

(12) United States Patent
Li et al.

(10) Patent No.: US 10,768,491 B2
(45) Date of Patent: Sep. 8, 2020

(54) ARRAY SUBSTRATE COMPRISING A PLURALITY OF FIRST PIXEL ELECTRODE STRIPS AND FIRST COMMON ELECTRODE STRIPS ARRANGED SYMMETRICALLY WITH RESPECT TO A SUB-AREA SYMMETRY AXIS OF A PIXEL UNIT SUB-AREA AND MANUFACTURE METHOD THEREOF, DISPLAY PANEL AND DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Peng Li, Beijing (CN); Jungho Park, Beijing (CN); Heecheol Kim, Beijing (CN); Jaikwang Kim, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 326 days.

(21) Appl. No.: 15/757,492

(22) PCT Filed: Aug. 2, 2017

(86) PCT No.: PCT/CN2017/095651
§ 371 (c)(1),
(2) Date: Mar. 5, 2018

(87) PCT Pub. No.: WO2018/133376
PCT Pub. Date: Jul. 26, 2018

(65) Prior Publication Data
US 2019/0361301 A1 Nov. 28, 2019

(30) Foreign Application Priority Data

Jan. 20, 2017 (CN) .......................... 2017 1 0044813

(51) Int. Cl.
G02F 1/1343 (2006.01)
G02F 1/1676 (2019.01)
G02F 1/1362 (2006.01)

(52) U.S. Cl.
CPC ...... *G02F 1/134309* (2013.01); *G02F 1/1676* (2019.01); *G02F 2001/136295* (2013.01); *G02F 2201/122* (2013.01); *G02F 2201/124* (2013.01)

(58) Field of Classification Search
CPC ....... G02F 2001/134318; G02F 1/1676; G02F 2201/124; G02F 2201/122
See application file for complete search history.

(56) References Cited

U.S. PATENT DOCUMENTS 10,120,244 B2 * 11/2018 Noguchi ........... G02F 1/133707
2007/0153199 A1 * 7/2007 Tak ................... G02F 1/134363
349/141

(Continued)

FOREIGN PATENT DOCUMENTS

CN 1881013 A 12/2006
CN 1991554 A 7/2007

(Continued)

OTHER PUBLICATIONS

The International Search Report and Written Opinion dated Nov. 15, 2017; PCT/CN2017/095651.

*Primary Examiner* — Paul C Lee

(57) ABSTRACT

An array substrate and a manufacture method thereof, a display panel and a display device. The array substrate includes pixel units. Each pixel unit includes a pixel electrode and a common electrode, which are respectively includes first pixel electrode strips and first common electrode strips that are arranged substantially in parallel in parallel in a first direction, each first common electrode strip overlaps at least one first pixel electrode strip. Each pixel (Continued)

unit includes at least one pixel unit sub-area, which has a sub-area symmetry axis, the first pixel electrode strip and the first common electrode strip are respectively arranged with respect to the sub-area symmetry axis symmetrically. On either side of the sub-area symmetry axis, the first common electrode strip is farther away from or closer to the sub-area symmetry axis than the at least one first pixel electrode strip that the each first common electrode strip overlaps.

20 Claims, 6 Drawing Sheets

(56) References Cited

U.S. PATENT DOCUMENTS

| | | | | |
|---|---|---|---|---|
| 2007/0153202 | A1* | 7/2007 | Kang | G02F 1/13439 349/141 |
| 2007/0273819 | A1* | 11/2007 | Kawasaki | G02F 1/134363 349/141 |
| 2009/0033848 | A1* | 2/2009 | Oka | G02F 1/134363 349/114 |
| 2009/0262286 | A1* | 10/2009 | Nishida | G02F 1/134363 349/114 |
| 2009/0279027 | A1* | 11/2009 | Nishida | G02F 1/133555 349/114 |
| 2011/0187950 | A1* | 8/2011 | Matsushima | G02F 1/133 349/33 |
| 2014/0307206 | A1* | 10/2014 | Xie | G02F 1/133555 349/96 |
| 2016/0004127 | A1* | 1/2016 | Qu | G09G 3/36 257/72 |

FOREIGN PATENT DOCUMENTS

| | | |
|---|---|---|
| CN | 102819153 A | 12/2012 |
| CN | 106773378 A | 5/2017 |
| KR | 20040043485 A | 5/2004 |

* cited by examiner

ARRAY SUBSTRATE COMPRISING A PLURALITY OF FIRST PIXEL ELECTRODE STRIPS AND FIRST COMMON ELECTRODE STRIPS ARRANGED SYMMETRICALLY WITH RESPECT TO A SUB-AREA SYMMETRY AXIS OF A PIXEL UNIT SUB-AREA AND MANUFACTURE METHOD THEREOF, DISPLAY PANEL AND DISPLAY DEVICE

TECHNICAL FIELD

Embodiments of the present disclosure relate to an array substrate and a manufacture method thereof, a display panel and a display device.

BACKGROUND

Display panels adopting advanced super dimension switch (ADS) display modes are widely used in display devices due to their advantage of wide viewing angle. However, an overlapping area of a pixel electrode and a common electrode in a display panel adopting the ADS display technology makes storage capacitance too large, and longer charging time of a thin film transistor is caused, therefore it is urgent to reduce the storage capacitance of the display panel adopting the ADS display technology. A conventional method of reducing the storage capacitance of display panel adopting ADS mode is to increase a thickness of an insulate layer between the pixel electrode and the common electrode or to reduce the overlapping area of the pixel electrode and the common electrode by reducing aperture ratio. For the first method, manufacture difficulty and manufacture cost of the display panel are increased; for the second method, the aperture ratio of the display panel is reduced, thus both of the above-mentioned two methods are contrary to consumers' expectations for the display device.

SUMMARY

An embodiment of the present disclosure provides an array substrate. The array substrate comprises a base substrate and a plurality of pixel units that are arranged in an array on the base substrate. Each of the pixel units comprises a pixel electrode, and a common electrode that is arranged in a different layer from the pixel electrode. The pixel electrode comprises a plurality of first pixel electrode strips and a plurality of first slits that are arranged between adjacent first pixel electrode strips, and the plurality of first pixel electrode strips are arranged substantially in parallel in a first direction. The common electrode comprises a plurality of first common electrode strips and a plurality of second slits that are arranged between adjacent first common electrode strips, and the plurality of first common electrode strips are arranged substantially in parallel in the first direction; each of the first common electrode strips overlaps at least one of the first pixel electrode strips. Each pixel unit comprises at least one pixel unit sub-area, the pixel unit sub-area has a sub-area symmetry axis, the first pixel electrode strips of the pixel electrode in the pixel unit sub-area are arranged with respect to the sub-area symmetry axis symmetrically, and the first common electrode strips of the common electrode in the pixel unit sub-area are arranged with respect to the sub-area symmetry axis symmetrically. In the pixel unit sub-area, on either side of the sub-area symmetry axis, each common electrode strip is farther away from or closer to the sub-area symmetry axis than the at least one of the first pixel electrode strips that the each first common electrode strip overlaps.

For example, in the array substrate provided by an embodiment of the present disclosure, the base substrate is arranged on a side of the common electrode that is away from the pixel electrode or on a side of the pixel electrode that is away from the common electrode.

For example, in the array substrate provided by at least one embodiment of the present disclosure, the first direction is parallel to a column direction of the plurality of pixel units that are arranged in an array.

For example, in the array substrate provided by an embodiment of the present disclosure, an extending direction of the first pixel electrode strips and an extending direction of the first common electrode strips are parallel to a row direction of the plurality of pixel units that are arranged in an array.

For example, in the array substrate provided by an embodiment of the present disclosure, each of the first common electrode strips overlaps one of the first pixel electrode strips, and in the pixel unit sub-area, on either side of the sub-area symmetry axis, each first common electrode strip is farther away from or closer to the sub-area symmetry axis than the first pixel electrode strip that the each first common electrode strip overlaps.

For example, in the array substrate provided by an embodiment of the present disclosure, the pixel electrode further comprises at least one second pixel electrode strip that electrically connects the plurality of first pixel electrode strips, and the common electrode further comprises at least one second common electrode strip that electrically connects the plurality of first common electrode strips.

For example, in the array substrate provided by an embodiment of the present disclosure, each pixel unit comprises at least two pixel unit sub-areas, and each pixel unit has a pixel area symmetry axis extending in a row direction of the pixel units, and the at least two pixel unit sub-areas are symmetrically arranged with respect to the pixel area symmetry axis.

For example, in the array substrate provided by an embodiment of the present disclosure, a width W1 of the first pixel electrode strip in the first direction and a width W2 of the first common electrode strip in the first direction satisfy the following condition: n*(W1+S1)=(W2+S2); S1 is an interval distance of the first pixel electrode strips that are arranged on either side of the sub-area symmetry axis in the first direction, S2 is an interval distance of the first common electrode strips that are arranged on either side of the sub-area symmetry axis in the first direction, and n is an integer that is greater than or equal to two.

An embodiment of the present disclosure further provides a display panel, the display panel comprises the above-mentioned array substrate.

Another embodiment of the present disclosure provides a display device, and the display device comprises the above-mentioned display panel.

Further another embodiment of the present disclosure provides a manufacture method of the array substrate, the manufacture method of the array substrate comprises providing a base substrate and forming a plurality of pixel units that are arranged in an array on the base substrate. Each of the pixel units comprises a pixel electrode, and a common electrode that is arranged in a different layer from the pixel electrode. The pixel electrode comprises a plurality of first pixel electrode strips and a plurality of first slits that are arranged between adjacent first pixel electrode strips, and the plurality of first pixel electrode strips are arranged substantially in parallel in a first direction. The common electrode comprises a plurality of first common electrode strips and a plurality of second slits that are arranged between adjacent first common electrode strips, and the plurality of first common electrode strips are arranged substantially in parallel in the first direction; each of the first common electrode strips overlaps at least one of the first pixel electrode strips. Each pixel unit comprises at least one pixel unit sub-area, the pixel unit sub-area has a sub-area symmetry axis, the first pixel electrode strips of the pixel electrode in the pixel unit sub-area are arranged with respect to the sub-area symmetry axis symmetrically, and the first common electrode strips of the common electrode in the pixel unit sub-area are arranged with respect to the sub-area symmetry axis symmetrically. In the pixel unit sub-area, on either side of the sub-area symmetry axis, each first common electrode strip is farther away from or closer to the sub-area symmetry axis than the at least one of the first pixel electrode strips that the each first common electrode strip overlaps.

For example, in the manufacture method provided by further another embodiment of the present disclosure, the base substrate is arranged on a side of the common electrode that is away from the pixel electrode or on a side of the pixel electrode that is away from the common electrode.

For example, in the manufacture method provided by further another embodiment of the present disclosure, the first direction is parallel to a column direction of the plurality of pixel units that are arranged in an array.

For example, in the manufacture method provided by further another embodiment of the present disclosure, the pixel electrode further comprises at least one second pixel electrode strip that electrically connects the plurality of first pixel electrode strips, and the common electrode further comprises at least one second common electrode strip that electrically connects the plurality of first common electrode strips.

For example, in the manufacture method provided by further another embodiment of the present disclosure, each pixel unit comprises at least two pixel unit sub-areas, and each pixel unit has a pixel area symmetry axis extending in a row direction of the pixel units, and at least two pixel unit sub-areas are symmetrically arranged with respect to the pixel area symmetry axis.

BRIEF DESCRIPTION OF THE DRAWINGS

In order to clearly illustrate the technical solution of the embodiments of the disclosure, the drawings used in the description of the embodiments or relevant technologies will be briefly described in the following; it is obvious that the described drawings are only related to some embodiments of the disclosure and thus are not limitative of the disclosure.

FIG. 2 (b) is a cross-sectional view along line I-I' of a display panel comprising the array substrate in FIG. 2 (a);

FIG. 3 (b) is a storage capacitance variety curve of a display panel, comprising the array substrate in FIG. 2 (a), along with voltage;

FIG. 3 (c) is a transmittance fluctuation variety curve of a display panel, comprising the array substrate in FIG. 2 (a), along with voltage;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
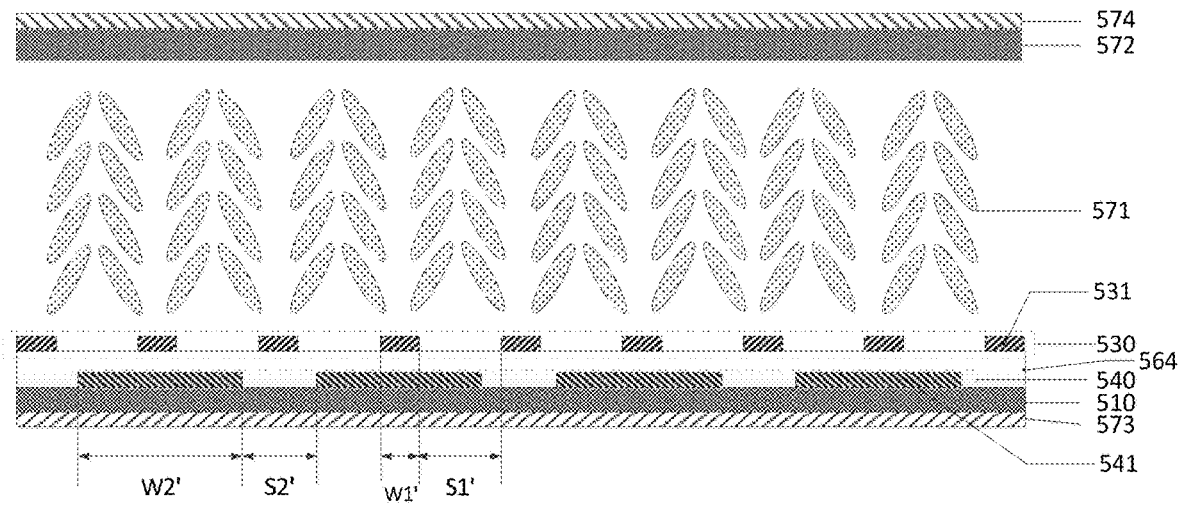
FIG. 1 is a cross-sectional view of a display panel with low storage capacitance.

The inventors notice that an overlapping area of a pixel electrode and a common electrode can be reduced by changing a plate-like common electrode into strip-like common electrodes and making part of the pixel electrode correspond to slits between the strip-like common electrodes. For example, FIG. 1 is a cross-sectional view of a display panel with low storage capacitance. As illustrated in FIG. 1, the display panel comprises an array substrate, the array substrate comprises a base substrate 510 and a plurality of pixel units that are arranged in an array on the base substrate 510, each pixel unit comprises: a pixel electrode 530, a common electrode 540 that is arranged in a different layer from the pixel electrode 530 and a dielectric material layer 564 that is between the pixel electrode 530 and the common electrode 540. The pixel electrode 530 can comprise a plurality of first pixel electrode strips 531, and the common electrode 540 can comprise a plurality of first common electrode strips 541. Part of the first pixel electrode strips 531 overlap the first common electrode strips 541, and orthographic projections of the part of the first pixel electrode strips 531 are located between two adjacent first common electrode strips 541. A width W1' of the first pixel electrode strip 531, a width W2' of the first common electrode strip 541, an interval distance S1' between adjacent first pixel electrode strips 531, and an interval distance S2' between adjacent first common electrode strips 541 satisfy the relationship: $2*(W1'+S1')=(W2'+S2')$. For example, the display panel can further comprise a glass substrate 572 that is arranged opposite to the array substrate, a liquid crystal layer 571 that is arranged between the array substrate and the glass substrate 572, a first polarizer 573 that is arranged on a side of the array substrate that is away from the liquid crystal layer 571, and a second polarizer 574 that is arranged on a side of the glass substrate 572 that is away from the liquid crystal layer 571. Because only part of the pixel electrodes 530 overlap the common electrodes 540, the storage capacitance can be reduced without increasing an interval distance between the pixel electrode 530 and the common electrode 540 and without decreasing aperture ratio of the array substrate.

However, the inventors also notice that for the display panel with low storage capacitance illustrated in FIG. 1, because the common electrode are changed from plate shapes to strip shapes, process fluctuation can cause centers of all the pixel electrodes deviate to one side with respect to corresponding centers of the common electrodes, this results in large fluctuation of transmittance of the display panel. For example, during manufacturing the pixel electrode, when the mask for the pattern process is deviated to the left side of the base substrate illustrated in FIG. 1 by 1 μm, the centers of all the pixel electrodes is deviated to the left side of the centers of the common electrodes by 1 μm. For example, during manufacturing the pixel electrode, when the mask for the pattern process is deviated to the right side of the base substrate as illustrated in FIG. 1 by 0.5 μm, the centers of all the pixel electrodes are deviated to the right side of the centers of the common electrodes by 0.5 μm. Therefore, the process fluctuation can cause a large fluctuation of the transmittance of the display panel, and thus affecting the users' experience. Therefore, it is urgent to solve the problem that the transmittance of the display panel with low storage capacitance changes too much along with the fluctuation of the process.

Embodiments of the present disclosure provide an array substrate and a manufacture method thereof, a display panel and a display device, by making each first common electrode strip on either side of the sub-area symmetry axis be farther away from or closer to the sub-area symmetry axis than at least one first pixel electrode that is overlapped with this first common electrode strip, the transmittances of the pixel unit sub-area on both sides of the sub-area symmetry axis can compensate for the process fluctuation occurring in the manufacturing process, and thus alleviating the problem that the transmittance of the display panel comprising the array substrate fluctuates too much due to the pixel electrodes of the array substrate with low storage capacitance deviate to same one side.

At least one embodiment of the present disclosure provides an array substrate. The array substrate comprises a base substrate and a plurality of pixel units that are arranged in an array on the base substrate. Each pixel unit comprises a pixel electrode, and a common electrode that is arranged in a different layer from the pixel electrode. The pixel electrode comprises a plurality of first pixel electrode strips and a plurality of first slits that are arranged between adjacent first pixel electrode strips, the plurality of first pixel electrode strips are arranged substantially in parallel in a first direction; the common electrode comprises a plurality of first common electrode strips, and a plurality of second slits that are arranged between adjacent first common electrode strips, and the plurality of first common electrode strips are arranged substantially in parallel in the first direction; each first common electrode strip overlaps at least one first pixel electrode strip. The pixel unit comprises at least one pixel unit sub-area, the pixel unit sub-area has a sub-area symmetry axis, the first pixel electrode strips of the pixel electrode in the pixel unit sub-area are arranged with respect to the sub-area symmetry axis symmetrically, and the first common electrode strips of the common electrode in the pixel unit sub-area are arranged with respect to the sub-area symmetry axis symmetrically; in the pixel unit sub-area, on either side of the sub-area symmetry axis, each first common electrode strip is farther away from or closer to the sub-area symmetry axis than the at least one first pixel electrode strip that the each first common electrode strip overlaps.

For example, taking an arrangement that each first common electrode strip only overlaps one first pixel electrode strip as an example to illustrate the embodiment of the present disclosure. However, each first common electrode strip is not limited to be arranged to overlap one first pixel electrode only, each first common electrode strip can also be arranged to overlap two or more first pixel electrode strips according to actual application requirements, the embodiments of the present disclosure are not limited in this aspect.

Figure 2:
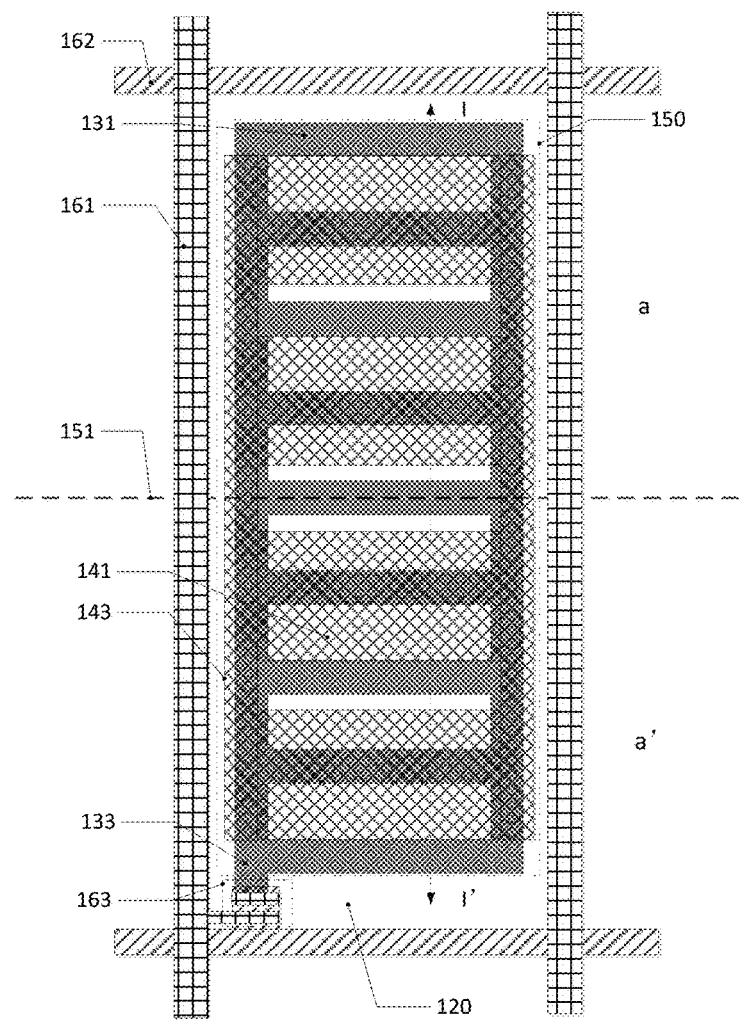
FIG. 2 (a) is a plan view of a structure of an array substrate provided by an embodiment of the present disclosure.
Figure 2:
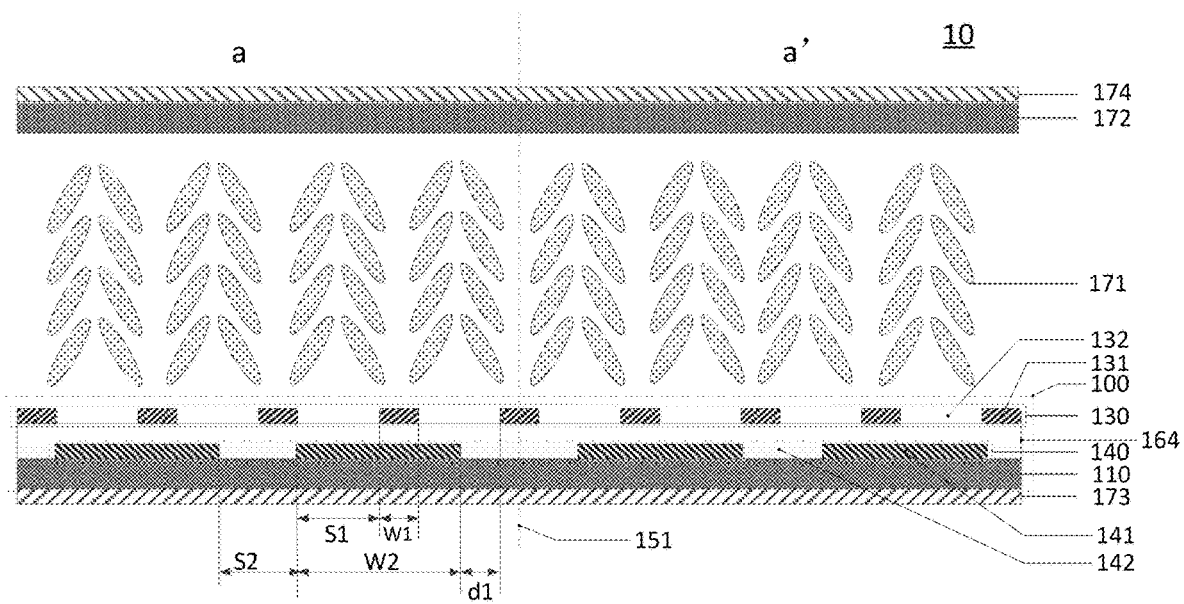

FIG. 2 (a) is a plan view of a structure of an array substrate 100 provided by an embodiment of the present disclosure, FIG. 2 (b) is a cross-sectional view along line I-I' of the display panel comprising the array substrate in FIG. 2 (a).

As illustrated in FIG. 2 (a) and FIG. 2 (b), the array substrate 100 comprises a base substrate 110, a plurality of pixel units 120 that are arranged in an array on the base substrate 110, and thin film transistors 163, gate lines 162 and data lines 161 that are used for driving the pixel units 120, the pixel units 120 are defined by the gate lines 162 and the data lines 161, which are intersected with each other. For example, each pixel unit 120 comprises a pixel electrode 130, a common electrode 140 that is arranged in a different layer from the pixel electrode 130, and a dielectric material layer 164 that is arranged between the pixel electrode 130 and the common electrode 140. For example, as illustrated in FIG. 2 (b), the base substrate 110 can be arranged on a side of the common electrode 140 that is away from the pixel electrode 130. Obviously, the arrangement of the base substrate 110 is not limited to the arrangement illustrated in FIG. 2 (b), the base substrate 110 can also be arranged on a side of the pixel electrode 130 that is away from the common electrode 140, and the embodiments of the present disclosure are not limited in this aspect.

For example, the base substrate 110 can be a glass substrate, a quartz substrate, a plastic substrate (such as a polyethylene terephthalate (PET) substrate), or a substrate made of other suitable materials. For example, the gate lines 162 and the data lines 161 can be formed of a metal material (such as copper, aluminum, or aluminum alloy). For example, the common electrode 140 and the pixel electrode 130 can be formed of a transparent conductive material. For example, the transparent conductive material can be indium tin oxide (ITO) or indium zinc oxide (IZO). For example, the pixel electrode 130 can also be formed of a metal material (such as copper, aluminum, or aluminum alloy). For example, the dielectric material layer 164 can be formed of an inorganic or organic material. For example, the dielectric material layer 164 can be formed of the organic resin, silicon oxide (SiOx), silicon oxynitride (SiNxOy), or silicon nitride (SiNx).

For example, the pixel electrode 130 can comprise a plurality of first pixel electrode strips 131, and a plurality of first slits 132 that are arranged between adjacent first pixel electrode strips 131, the plurality of first pixel electrode strips 131 are arranged substantially in parallel in a first direction; the common electrode 140 can comprise a plurality of first common electrode strips 141, and a plurality of second slits 142 that are arranged between adjacent first common electrode strips 141, the plurality of first common electrode strips 141 are arranged substantially in parallel in the first direction. Each first common electrode strip 141 overlaps one first pixel electrode strip 131.

Figure 4:
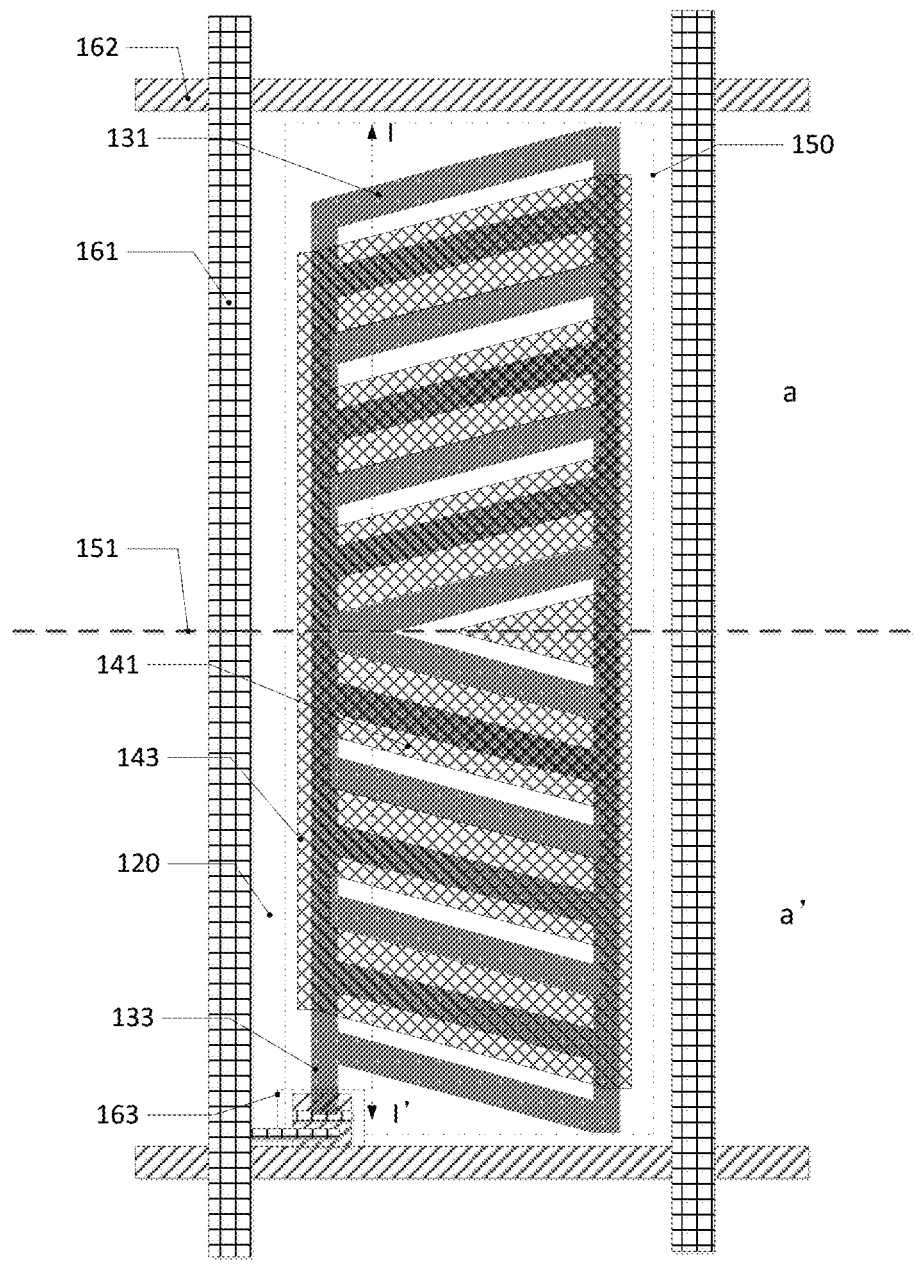
FIG. 4 is a plan view of another structure of an array substrate provided by an embodiment of the present disclosure.

For example, the first direction can be parallel to a column direction of the plurality of pixel units 120 that are arranged in an array, that is, parallel to an extending direction of the data line 161. For example, as illustrated in FIG. 2 (a), an extending direction of the first pixel electrode strips 131 and an extending direction of the first common electrode strips 141 are parallel to a row direction of the plurality of pixel units 120 that are arranged in an array, that is, parallel to an extending direction of the gate line 162. Obviously, the extending direction of the first pixel electrode strips 131 and the extending direction of the first common electrode strips 141 are not limited to the arrangement illustrated in FIG. 2 (a), the extending direction of the first pixel electrode strips 131 and the extending direction of the first common electrode strips 141 can also be arranged to be intersected with the extending direction of the gate line 162 as illustrated in FIG. 4, in such a case, the first pixel electrode strips 131 and the first common electrode strips 141 are respectively arranged in a splayed shape in the first direction.

For example, as illustrated in FIG. 2 (a) and FIG. 2 (b), each pixel electrode 130 comprises two second pixel electrode strips 133 that electrically connect the plurality of first pixel electrode strips 131, the common electrode 140 further comprises two second common electrode strips 143 that electrically connect the plurality of first common electrode strips 141, the second pixel electrode strips 133 and the second common electrode strips 143 are respectively used for applying voltages to the plurality of first pixel electrode strips 131 and the plurality of common electrode strips 141, so that the plurality of first pixel electrode strips 131 are at same one electrical potential and the plurality of first common electrode strips 141 are at same one electrical potential. Obviously, each pixel electrode 130 can comprise one or more second pixel electrode strips 133 and each common electrode 140 can comprise one or more second common electrode strips 143 according to actual application requirements, the embodiments of the present disclosure are not limited in this aspect.

For example, as illustrated in FIG. 2 (a) and FIG. 2 (b), each pixel unit 120 can comprise one pixel unit sub-area 150. For example, the pixel unit sub-area 150 has a sub-area symmetry axis 151, and the first pixel electrode strips 131 of the pixel electrode 130 in the pixel unit sub-area 150 and the first common electrode strips 141 of the common electrode 140 in the pixel unit sub-area 150 are respectively arranged with respect to the sub-area symmetry axis symmetrically 151. For example, the symmetrical arrangement herein also comprises a substantially symmetrical arrangement. For example, the shapes and the widths of the first pixel electrode strips 131 and the first common electrode strips 141 can deviate from a predetermined value by a certain extent, due to the process accuracy. For example, the widths of the first pixel electrode strip 131 and the first common electrode strip 141 can deviate from predetermined values. For example, the deviations from the predetermined value are ±0.5 μm. For example, the arrangement angles or the arrangement positions of the first pixel electrode strips 131 and the first common electrode strips 141 can also deviate from the predetermined value by a certain extent due to the process accuracy. For example, the arrangement angles of the first pixel electrode strips 131 and the first common electrode strips 141 can deviate from the predetermined position by 0.1 degree. The above-mentioned substantially symmetrical arrangement caused by the process accuracy is also within the scope of the present disclosure.

For example, a width W1 of the first pixel electrode strip in the first direction and a width W2 of the first common electrode strip in the first direction satisfy the following condition: $n*(W1+S1)=(W2+S2)$; in which S1 is an interval distance of the first pixel electrode strips that are arranged on either side of the sub-area symmetry axis in the first direction, S2 is an interval distance of the first common electrode strips that are arranged on either side of the sub-area symmetry axis in the first direction, and n is an integer that is greater than or equal to two.

Figure 6:
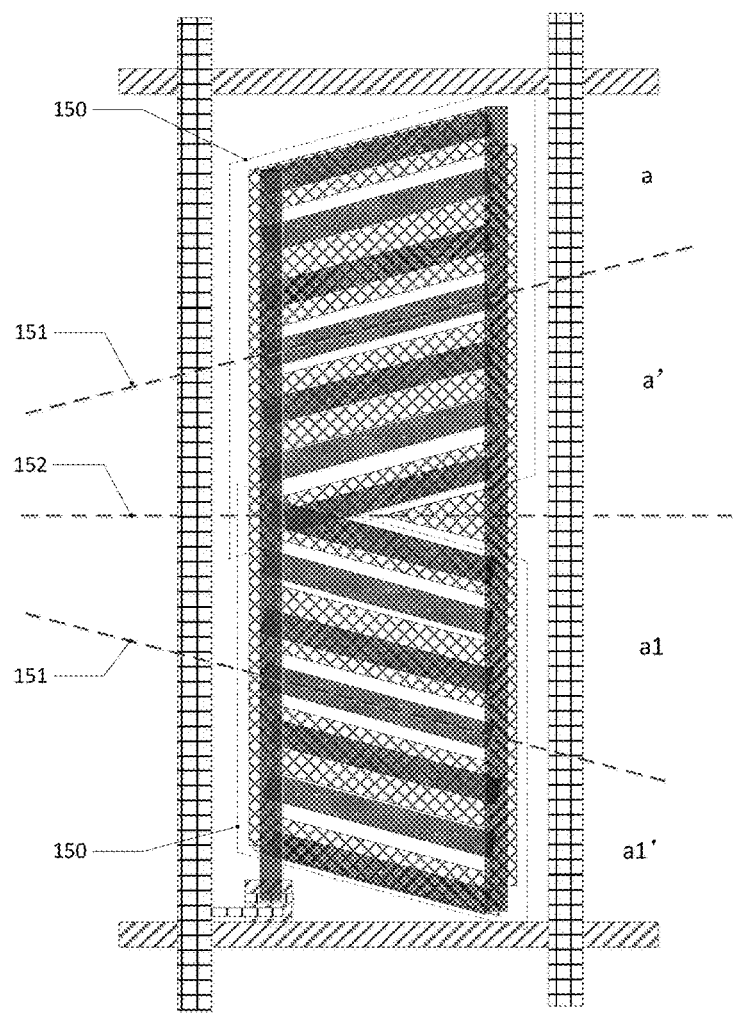
FIG. 6 is a plan view of further another structure of an array substrate provided by an embodiment of the present disclosure.

For example, as illustrated in FIG. 2 (a) and FIG. 2 (b), the widths of the plurality of first pixel electrode strips 131 in the first direction are the same, and the widths of the plurality of first common electrode strips 141 in the first direction are the same. For example, the width W1 of the first pixel electrode strip 131 in the first direction and the width W2 of the first common electrode strip 141 in the first direction can be respectively arranged to be 2.5 μm and 13.5 μm. For example, the interval distance S1 of the first pixel electrode strips 131 that are arranged on either side of the sub-area symmetry axis 151 in the first direction and the interval distance S2 of the first common electrode strips 141 that are arranged on either side of the sub-area symmetry axis 151 in the first direction can be respectively arranged to be 6.5 μm and 4.5 μm, and n is 2 in such a case. Obviously, according to actual application requirements, the plurality of first pixel electrode strips 131 can also be arranged in a form that the widths of the first pixel electrode strips 131 are not completely the same in the first direction as illustrated in FIG. 6, and the plurality of first common electrode strips 141 can also be arranged in a form that the widths of first common electrode strips are not completely the same in the first direction as illustrated in FIG. 6, the embodiments of the present disclosure are not limited in this aspect.

For example, as illustrated in FIG. 2 (a) and FIG. 2 (b), in the pixel unit sub-area 150, on either side of the sub-area symmetry axis 151, the first common electrode strip 141 (for example, a center line of the first common electrode strip 141, which is extended along an extending direction of the first common electrode strip 141) is farther away from the sub-area symmetry axis 151 than the first pixel electrode strip 131 (for example, a center line of the first pixel electrode strip 131, which is extended along an extending direction of the first pixel electrode strip 131). For example, as illustrated in FIG. 2 (b), the first pixel electrode strips 131 have same one interval distance in an entire pixel unit sub-area 150; each first common electrode strip 141 that is arranged in an "a" area of the sub-area deviate to the left with respect to the first pixel electrode strip 131 that the first common electrode strip 141 overlaps, and each first common electrode strip 141 that is arranged in an "a'" area of the sub-area deviate to the right with respect to the first pixel electrode strip 131 that the first common electrode strip 141 overlaps. In such a case, the interval distance between adjacent first common electrode strips 141 on either side of the sub-area symmetry axis 151 is the same, and the interval distance between the rightmost first common electrode strip 141 in the "a" area of the sub-area and the leftmost first common electrode strip 141 in the "a'" area of the sub-area is greater than the interval distance between adjacent first common electrode strips 141 on either side of the sub-area symmetry axis 151.

For example, d1 illustrated in FIG. 2 (b) can be arranged to be 2.0 µm, and S1 and S2 can be respectively arranged to be 6.5 µm and 4.5 µm. In such a case, the interval distance between the rightmost first common electrode strip 141 in the "a" area and the leftmost first common electrode strip 141 in the "a'" area is 6.5 µm, and each first common electrode strip 141 in the "a" region (for example, all the first common electrode strips 141 in the "a" area) deviates to the left by 1.0 µm in the first direction with respect to the first pixel electrode strip 131 that the first common electrode strip 141 overlaps, and each first common electrode strip 141 in the "a'" area (for example, all the first common electrode strips 141 in the "a'" area) deviates to the right by 1.0 µm in the first direction with respect to the first pixel electrode strip 131 that the first common electrode strip 141 overlaps.

For example, the distance between the left side of each first common electrode strip 141 in the "a" region and the first pixel electrode strip 131 on the left side of this first common electrode strip 141 can be arranged to zero, therefore the fluctuation of the storage capacitance can be reduced.

For example, as for the above-mentioned pixel structure, in the case that process fluctuations are existed in the manufacture process, for example, in the process of manufacturing the pixel electrode 130 using a mask, when the position of the mask deviates to the left from the predetermined position by 0.8 µm, as for the manufactured pixel electrode 130, the first common electrode strip 141 in the "a" region deviates to the left by 0.2 µm in the first direction with respect to the first pixel electrode strip 131 that the first common electrode strip 141 overlaps; the first common electrode strip 141 in the "a'" region deviates to the right by 1.8 µm in the first direction with respect to the first pixel electrode strip 131 that the each first common electrode strip 141 overlaps. For example, in the case that the position of the mask deviates to the right from the predetermined position by 0.5 µm, as for the manufactured pixel electrode 130, the first common electrode strip 141 in the "a" area deviates to the left by 1.5 µm in the first direction with respect to the first pixel electrode strip 131 that the each first common electrode strip 141 overlaps, and the first common electrode strip 141 in the "a'" area deviates to the right by 0.5 µm in the first direction with respect to the first pixel electrode strip 131 that the each first common electrode strip 141 overlaps.

Figure 3:
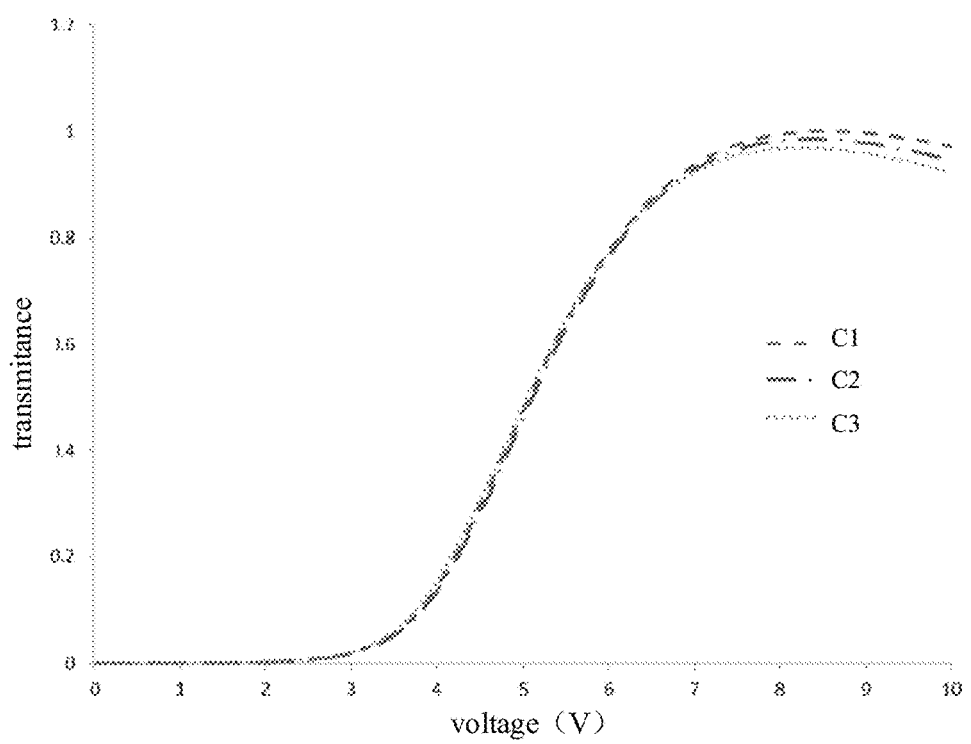
FIG. 3 (a) is a transmittance variety curve of a display panel, comprising the array substrate in FIG. 2 (a), along with voltage.
Figure 3:
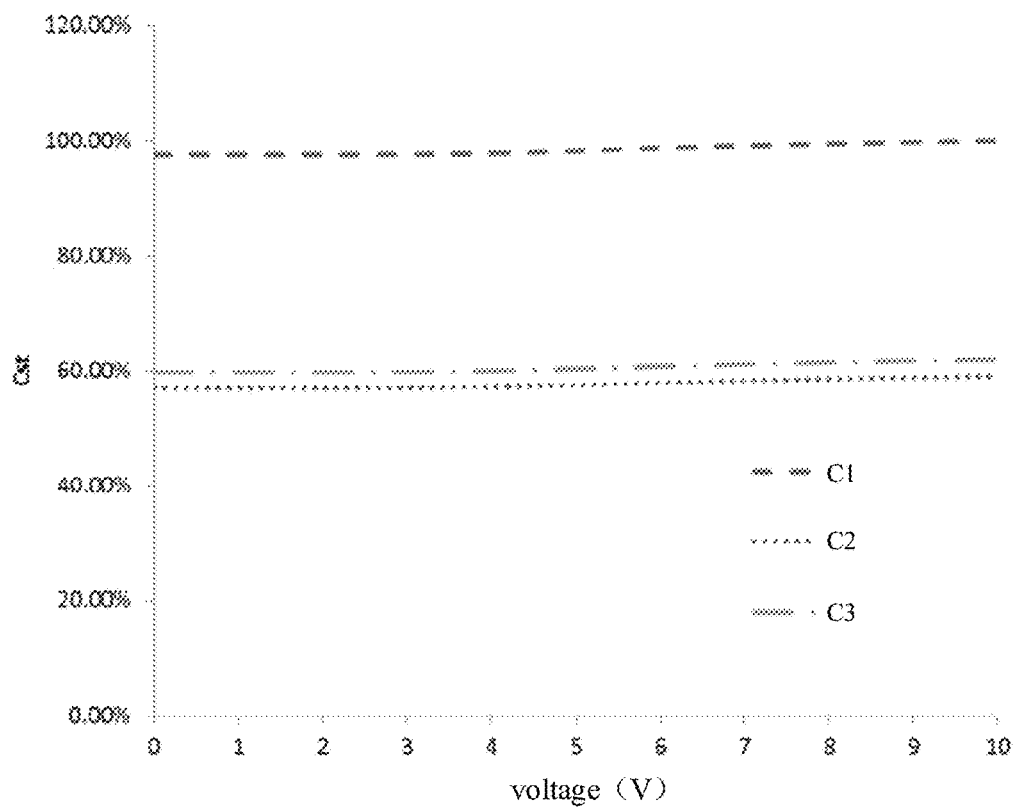
Figure 3:
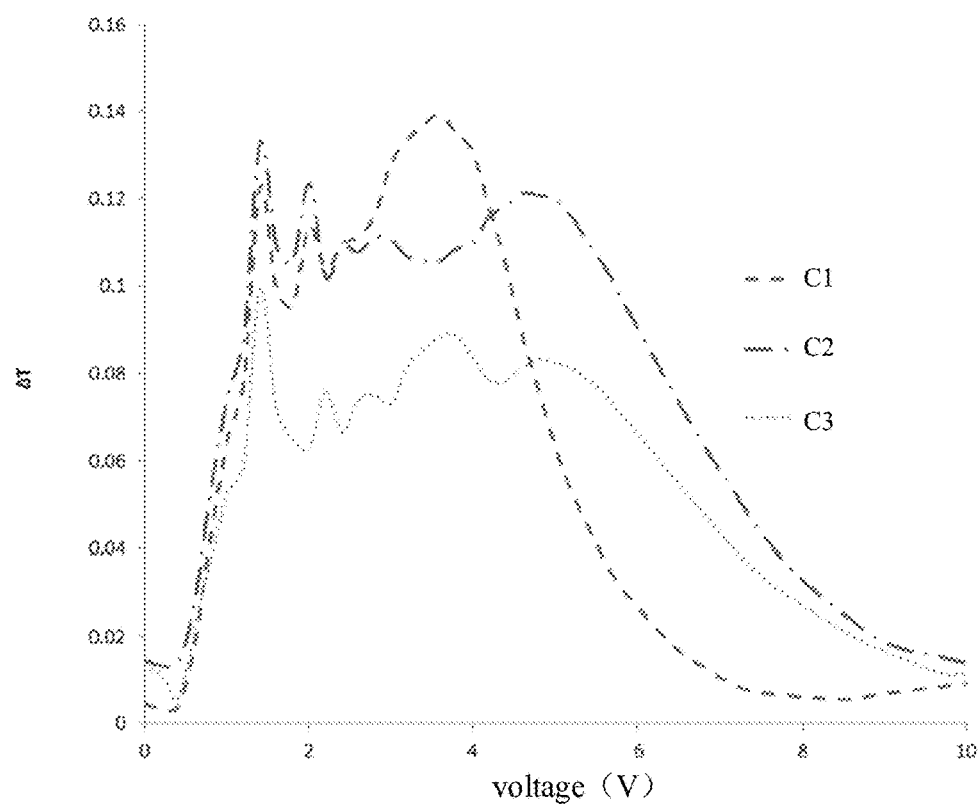

FIG. 3 (a)-FIG. 3(c) respectively illustrate the variety curve of transmittance, storage capacitance (namely, Cst) and transmittance fluctuation (namely, ΔT) with voltage of a conventional ADS structure display panel (namely, C1), a display panel with low storage capacitance (namely, C2) and a display panel (namely, C3) comprising the array substrate 100 provided by an embodiment (namely, the embodiments illustrated in FIG. 2 (a) and FIG. 2(b)) of the present disclosure, in which the process fluctuation can make the pixel electrode 130 deviate from the predetermined position by ±1 µm with respect to the common electrode 140 and make the width fluctuations of the pixel electrode 130 and the common electrode 140 are deviating from the predetermined width by ±0.2 µm, the embodiments of the present disclosure are not limited in this aspect.

For example, as illustrated in FIG. 3 (a), the transmittance of the display panel comprising the array substrate 100 provided in an embodiment of the present disclosure is close to the transmittances of the conventional ADS structure display panel and the display panel with low storage capacitance, therefore, the structure of the array substrate 100 provided by an embodiment of the present disclosure has little influence on the transmittance of the display panel comprising the array substrate 100. As illustrated in FIG. 3 (b), the storage capacitance of the display panel comprising the array substrate 100 provided in an embodiment of the present disclosure is slightly larger than the storage capacitance of the display panel with low storage capacitance but much smaller than the storage capacitance of the conventional ADS structure display panel, therefore, the structure of the array substrate 100 provided in an embodiment of the present disclosure still has a good effect of reducing the storage capacitance. As illustrated in FIG. 3 (c), the transmittance fluctuation of the display panel comprising the array substrate 100 provided in an embodiment of the present disclosure is smaller than the transmittance fluctuations of the conventional ADS structure display panel and the display panel with low storage capacitance.

Therefore, by making the first pixel electrode strips 131 of the pixel electrode 130 in the pixel unit sub-area 150 and the first common electrode strip 141 of the common electrode 130 in the pixel unit sub-area 150 be respectively arranged with respect to the sub-area symmetry axis 151 symmetrically, and making each first common electrode strip 141 on either side of the sub-area symmetry axis 151 be farther away from or closer to the sub-area symmetry axis 151 than the first pixel electrode strip 131 that the first common electrode strip 141 overlaps, the transmittances of both sides of the sub-area symmetry axis 151 of the pixel unit sub-area 150 can be compensated with each other when a process fluctuation occurs in the manufacturing process. Therefore, the above-mentioned pixel structure can alleviate the problem of large fluctuation of the transmittance caused by the case that the pixel electrodes 130 of the array substrate 100 with low storage capacitance are deviated to same one side.

For example, the arrangement of the first pixel electrode strip 131 and the first common electrode strip 141 is not limited to be a case that the first pixel electrode strips 131 have the same interval distance in the entire pixel unit sub-area 150 and each first common electrode strip 141 on either side of the sub-area symmetry axis 151 is farther away from the sub-area symmetry axis 151 than the first pixel electrode strips 131 that the first common electrode strip 141 overlaps, illustrated in FIG. 2 (a) and FIG. 2 (b). For example, the first pixel electrode strips 131 and the first common electrode strips 141 can also be configured to be a case that the first pixel electrode strips 131 have same one interval distance in the entire pixel unit sub-area 150 and each first common electrode strip 141 on either side of the sub-area symmetry axis 151 is closer to the sub-area symmetry axis 151 than the first pixel electrode strip 131 that the first common electrode strip 141 overlaps. For example, the first pixel electrode strips 131 and the first common electrode strips 141 can also be configured to be a case that the first common electrode strips 141 have same one interval distance in the entire pixel unit sub-area 150, each first pixel electrode strip 131 on either side of the sub-area symmetry axis 151 is closer to or farther away from the sub-area symmetry axis 151 than the first common electrode strip 141 that overlaps this first pixel electrode strip 131. For example, the first pixel electrode strips 131 and the first common electrode strips 141 can also be configured to be a case that all the first pixel electrode strips 131 and all of the first common electrode strips 141 on either side of the sub-area symmetry axis 151 are close to or far away from the sub-area symmetry axis 151, and each first pixel electrode strip 131 on either side of the sub-area symmetry axis 151 is closer to or farther away from the sub-area symmetry axis 151 than the first common electrode strip 141 that overlaps this first pixel electrode strips 131. The embodiments of the present disclosure are not limited in this aspect.

Figure 5:
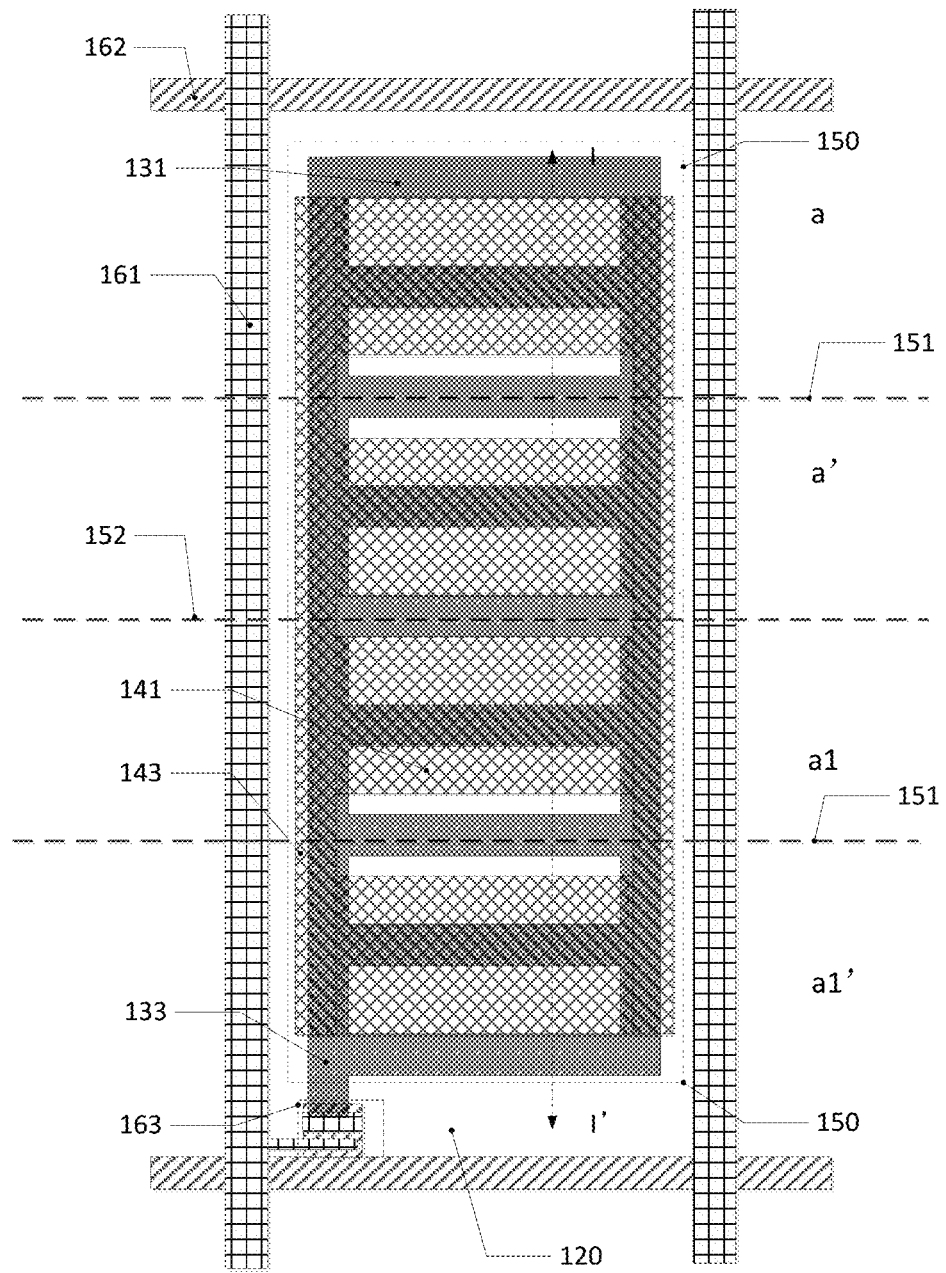
FIG. 5 is a plan view of further another structure of an array substrate provided by an embodiment of the present disclosure.

For example, the pixel unit is not limited to comprise only one pixel unit sub-area 150 illustrated in FIG. 2 (*a*) and FIG. 2 (*b*), according to actual application requirements, each pixel unit can further comprise two or more pixel unit sub-areas 150. For example, as illustrated in FIG. 5 and FIG. 6, the pixel unit can comprise two pixel unit sub-areas 150. For example, the pixel unit has a pixel area symmetry axis 152 extending in a row direction of the pixel units 120, and the at least two pixel unit sub-areas 150 are symmetrically arranged with respect to the pixel area symmetry axis 152.

For example, an embodiment of the present disclosure further provides a display panel 10, as illustrated in FIG. 2 (*b*), the display panel 10 comprises the array substrate 100 provided by an embodiment of the present disclosure. For example, the display panel 10 can further comprise a glass substrate 172 that is arranged opposite to the array substrate 100, a liquid crystal layer 171 that is arranged between the array substrate 100 and the glass substrate 172, a first polarizer 173 that is arranged on a side of the array substrate 100 that is away from the liquid crystal layer 171, and a second polarizer 174 that is arranged on a side of the glass substrate 172 that is away from the liquid crystal layer 171. For example, according to actual application requirements, the glass substrate 172 of the display panel 10 provided by an embodiment of the present disclosure can also be replaced by a quartz substrate, a plastic substrate (such as a polyethylene terephthalate (PET) substrate) or a substrate made of a suitable material, the embodiments of the present disclosure are not limited in this aspect.

For example, by making each first common electrode strip on either side of the sub-area symmetry axis be farther away from or closer to the sub-area symmetry axis than the at least one first pixel electrode strip that the each first common electrode strip overlaps, the transmittances of the pixel unit sub-area on both sides of the sub-area symmetry axis can be compensated with each other for the process fluctuation that occurs in the manufacturing process, alleviating the problem of large fluctuation of the transmittance caused by the case that the pixel electrodes of the display panel with low storage capacitance are deviated to same one side.

Figure 7:
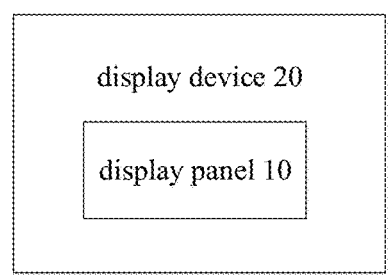
FIG. 7 is a schematically block diagram of a display device provided by another embodiment of the present disclosure.

For example, FIG. 7 is a schematically block diagram of a display device provided by another embodiment of the present disclosure. The display device 20 comprises the display panel 10 provided by any one of the embodiments of the present disclosure or the array substrate provided by any one of the embodiments of the present disclosure. It should be noted that those skilled in the art should understand that other indispensable components (such as a control device, an image data encoding/decoding device, a row scan driver, a column scan driver, a clock circuit and the like) are all comprised in the display device 20, no further descriptions will be given herein and it should not be taken as a limitation on the embodiments of the present disclosure. For example, by making each first common electrode strip on either side of the sub-area symmetry axis be farther away from or closer to the sub-area symmetry axis than the at least one first pixel electrode strip that the each first common electrode strip overlaps, the transmittances of the pixel unit sub-area on both sides of the sub-area symmetry axis can be compensated with each other for the process fluctuation that occurs in the manufacturing process, alleviating the problem of large fluctuation of the transmittance caused by the case that the pixel electrodes of the display panel with low storage capacitance is deviated to the same side.

For example, at least one embodiment of the present disclosure provides a manufacture method of the array substrate, the manufacture method of the array substrate comprises providing a base substrate and forming a plurality of pixel units that are arranged in an array on the base substrate. Each of the pixel units comprises a pixel electrode, and a common electrode that is arranged in a different layer from the pixel electrode. The pixel electrode comprises a plurality of first pixel electrode strips and a plurality of first slits that are arranged between adjacent first pixel electrode strips, the plurality of first pixel electrode strips are arranged substantially in parallel in a first direction. The common electrode comprises a plurality of first common electrode strips and a plurality of second slits that are arranged between adjacent first common electrode strips, and the plurality of first common electrode strips are arranged substantially in parallel in the first direction; each of the first common electrode strips overlaps at least one of the first pixel electrode strips. Each pixel unit comprises at least one pixel unit sub-area, the pixel unit sub-area has a sub-area symmetry axis, the first pixel electrode strips of the pixel electrode in the pixel unit sub-area are arranged with respect to the sub-area symmetry axis symmetrically, and the first common electrode strips of the common electrode in the pixel unit sub-area are arranged with respect to the sub-area symmetry axis symmetrically. In the pixel unit sub-area, on either side of the sub-area symmetry axis, each first common electrode strip is farther away from or closer to the sub-area symmetry axis than the at least one of the first pixel electrode strips that the each first common electrode strip overlaps.

Figure 8:
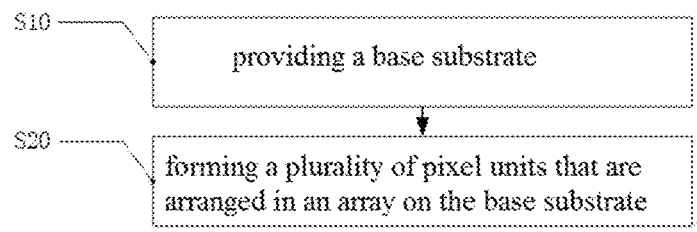
FIG. 8 is a manufacture method of an array substrate provided by further another embodiment of the present disclosure.

For example, FIG. 8 is a manufacture method of an array substrate provided by further another embodiment of the present disclosure. As illustrated in FIG. 8, the manufacture method can comprise the following steps:

Step S10: providing a base substrate; and

Step S20: forming a plurality of pixel units that are arranged in an array on the base substrate.

For example, a plurality of pixel units are defined by a plurality of gate lines and a plurality of data lines which are intersected with each other. For example, each pixel unit comprises a pixel electrode, a common electrode that is arranged in a different layer from the pixel electrode, and a dielectric material layer that is arranged between the pixel electrode and the common electrode. For example, according to actual application requirements, the base substrate can be arranged on a side of the common electrode that is away from the pixel electrode or on a side of the pixel electrode that is away from the common electrode, the embodiments of the present disclosure are not limited in this aspect. For example, the materials for forming the gate lines, the data lines, the pixel electrodes, the common electrodes and the dielectric material layer can be referred to the embodiments illustrated in FIG. 2 (*a*) and FIG. 2 (*b*), and details are not described here again.

For example, the pixel electrode can comprise a plurality of first pixel electrode strips and a plurality of first slits that are arranged between adjacent first pixel electrode strips, the plurality of first pixel electrode strips are arranged substantially in parallel in a first direction; the common electrode comprises a plurality of first common electrode strips and a plurality of second slits that are arranged between adjacent first common electrode strips, and the plurality of first common electrode strips are arranged substantially in parallel in the first direction. Each first common electrode strip overlaps one first pixel electrode strips. For example, the pixel electrode further comprises at least one second pixel electrode strip that electrically connect the plurality of first pixel electrode strips, the common electrode further comprises at least one second common electrode strips that electrically connect the plurality of first common electrode strips. For example, the related descriptions of the first direction, the extending direction of the first pixel electrode strip and the first common electrode strip, and the second pixel electrode strip and the second common electrode strip can be referred to the embodiments illustrated in FIG. 2 (a) and FIG. 2 (b), it is not described here again.

For example, the pixel unit can comprise at least one pixel unit sub-area, each pixel unit sub-area has a sub-area symmetry axis, the first pixel electrode strips of the pixel electrode in the pixel unit sub-area are arranged with respect to the sub-area symmetry axis symmetrically, and the first common electrode strips of the common electrode in the pixel unit sub-area are arranged with respect to the sub-area symmetry axis symmetrically. In the pixel unit sub-area, on either side of the sub-area symmetry axis, the center line of the first common electrode strip, which is extended in an extending direction of the first common electrode strip, is farther away from or closer to the sub-area symmetry axis than the center line, which is extended in an extending direction of the first pixel electrode strip, of the first pixel electrode strip that the each first common electrode strip overlaps.

For example, the specific arrangement regarding to the following content can be referred to the embodiments illustrated in FIG. 2 (a) and FIG. 2 (b), and details are not described here again: the specific arrangement to allow the first pixel electrode strips of the pixel electrode in the pixel unit sub-area and the first common electrode strips of the common electrode in the pixel unit sub-area are symmetrically arranged with respect to the sub-area symmetry axis; the condition that is satisfied by the widths W1 and W2 of the first pixel electrode strip and the first common electrode strip in the first direction, and the interval distances S1 and S2 of the first pixel electrode strips and the first common electrode strips that are arranged on either side of the sub-area symmetry axis in the first direction, and the exemplary arrangement; the variety curves of transmittance, storage capacitance and transmittance fluctuation along with voltage of a conventional ADS structure display panel, a display panel with low storage capacitance and a display panel comprising the array substrate provided by an embodiment of the present disclosure; and the number and the arrangement of sub-areas in the pixel unit.

By making the first pixel electrode strips of the pixel electrode in the pixel unit sub-area and the first common electrode strips of the common electrode in the pixel unit sub-area be respectively arranged with respect to the sub-area symmetry axis symmetrically, and making each first common electrode strip on either side of the sub-area symmetry axis be farther away from or closer to the sub-area symmetry axis than the at least one first pixel electrode strip that the each first common electrode strip overlaps, the transmittances of the pixel unit sub-area on both sides of the sub-area symmetry axis can be compensated with each other when a process fluctuation occurs in the manufacturing process. Therefore, the above-mentioned pixel structure can alleviate the problem of large fluctuation of the transmittance of the display panel comprising the array substrate caused by the case that the pixel electrodes of the array substrate with low storage capacitance are deviated to same one side.

An array substrate and a manufacture method thereof, a display panel and a display device provided by the embodiments of the present disclosure can alleviate the problem of large fluctuation of the transmittance caused by the case that the pixel electrodes of the array substrate with low storage capacitance are deviated to same one side.

What are described above is related to the specific embodiments of the disclosure only and not limitative to the scope of the disclosure. The protection scope of the disclosure shall be based on the protection scope of the claims.

The present application claims priority to the Chinese patent application No. 201710044813.4, filed Jan. 20, 2017, the entire disclosure of which is incorporated herein by reference as part of the present application.

What is claimed is:

1. An array substrate, comprising:
a base substrate, and a plurality of pixel units that are arranged in an array on the base substrate, wherein each of the pixel units comprises:
a pixel electrode, wherein the pixel electrode comprises a plurality of first pixel electrode strips and a plurality of first slits that are arranged between adjacent first pixel electrode strips, and the plurality of first pixel electrode strips are arranged substantially in parallel in a first direction;
a common electrode that is arranged in a different layer from the pixel electrode, wherein the common electrode comprises a plurality of first common electrode strips and a plurality of second slits that are arranged between adjacent first common electrode strips, and the plurality of first common electrode strips are arranged substantially in parallel in the first direction,
wherein each of the first common electrode strips overlaps at least one of the first pixel electrode strips;
each pixel unit comprises at least one pixel unit sub-area, the pixel unit sub-area has a sub-area symmetry axis, the first pixel electrode strips of the pixel electrode in the pixel unit sub-area are arranged with respect to the sub-area symmetry axis symmetrically, and the first common electrode strips of the common electrode in the pixel unit sub-area are arranged with respect to the sub-area symmetry axis symmetrically,
in the pixel unit sub-area, on either side of the sub-area symmetry axis, a center line, which is extended in an extending direction of each first common electrode strip, of the each first common electrode strip is farther away from or closer to the sub-area symmetry axis than a center line, which is extended in an extending direction of the at least one of the first pixel electrode strips, of the at least one of the first pixel electrode strips that the each first common electrode strip overlaps.

2. The array substrate according to claim 1, wherein the base substrate is arranged on a side of the common electrode that is away from the pixel electrode or on a side of the pixel electrode that is away from the common electrode.

3. The array substrate according to claim 1, wherein the first direction is parallel to a column direction of the plurality of pixel units that are arranged in an array.

4. The array substrate according to claim 1, wherein an extending direction of the first pixel electrode strips and an extending direction of the first common electrode strips are parallel to a row direction of the plurality of pixel units that are arranged in an array.

5. The array substrate according to claim 1, wherein each of the first common electrode strips overlaps one of the first pixel electrode strips, and in the pixel unit sub-area, on either side of the sub-area symmetry axis, each first common electrode strip is farther away from or closer to the sub-area symmetry axis than the first pixel electrode strip that the each first common electrode strip overlaps.

6. The array substrate according to claim 1, wherein the pixel electrode further comprises at least one second pixel electrode strip that electrically connects the plurality of first pixel electrode strips, and the common electrode further comprises at least one second common electrode strip that electrically connects the plurality of first common electrode strips.

7. The array substrate according to claim 1, wherein each pixel unit comprises at least two pixel unit sub-areas, and each pixel unit has a pixel area symmetry axis extending in a row direction of the pixel units, and the at least two pixel unit sub-areas are symmetrically arranged with respect to the pixel area symmetry axis.

8. An array substrate, comprising:
a base substrate, and a plurality of pixel units that are arranged in an array on the base substrate, wherein each of the pixel units comprises:
a pixel electrode, wherein the pixel electrode comprises a plurality of first pixel electrode strips and a plurality of first slits that are arranged between adjacent first pixel electrode strips, and the plurality of first pixel electrode strips are arranged substantially in parallel in a first direction;
a common electrode that is arranged in a different layer from the pixel electrode, wherein the common electrode comprises a plurality of first common electrode strips and a plurality of second slits that are arranged between adjacent first common electrode strips, and the plurality of first common electrode strips are arranged substantially in parallel in the first direction,
wherein each of the first common electrode strips overlaps at least one of the first pixel electrode strips;
each pixel unit comprises at least one pixel unit sub-area, the pixel unit sub-area has a sub-area symmetry axis, the first pixel electrode strips of the pixel electrode in the pixel unit sub-area are arranged with respect to the sub-area symmetry axis symmetrically, and the first common electrode strips of the common electrode in the pixel unit sub-area are arranged with respect to the sub-area symmetry axis symmetrically,
in the pixel unit sub-area, on either side of the sub-area symmetry axis, each first common electrode strip is farther away from or closer to the sub-area symmetry axis than the at least one of the first pixel electrode strips that the each first common electrode strip overlaps;
the first direction is parallel to a column direction of the plurality of pixel units that are arranged in an array;
a width W1 of the first pixel electrode strip in the first direction and a width W2 of the first common electrode strip in the first direction satisfy the following condition:

$$n*(W1+S1)=(W2+S2)$$

wherein S1 is an interval distance of the first pixel electrode strips that are arranged on either side of the sub-area symmetry axis in the first direction, S2 is an interval distance of the first common electrode strips that are arranged on either side of the sub-area symmetry axis in the first direction, and n is an integer that is greater than or equal to two.

9. A display panel, comprising the array substrate according to claim 1.

10. A display device, comprising the display panel according to claim 9.

11. A manufacture method of the array substrate according to claim 1, comprising:
providing a base substrate;
forming a plurality of pixel units that are arranged in an array on the base substrate, wherein each of the pixel units comprises:
a pixel electrode, wherein the pixel electrode comprises a plurality of first pixel electrode strips and a plurality of first slits that are arranged between adjacent first pixel electrode strips, and the plurality of first pixel electrode strips are arranged substantially in parallel in a first direction;
a common electrode that is arranged in a different layer from the pixel electrode, wherein the common electrode comprises a plurality of first common electrode strips and a plurality of second slits that are arranged between adjacent first common electrode strips, and the plurality of first common electrode strips are arranged substantially in parallel in the first direction,
wherein each of the first common electrode strips overlaps at least one of the first pixel electrode strips;
each pixel unit comprises at least one pixel unit sub-area, the pixel unit sub-area has a sub-area symmetry axis, the first pixel electrode strips of the pixel electrode in the pixel unit sub-area are arranged with respect to the sub-area symmetry axis symmetrically, and the first common electrode strips of the common electrode in the pixel unit sub-area are arranged with respect to the sub-area symmetry axis symmetrically,
in the pixel unit sub-area, on either side of the sub-area symmetry axis, each first common electrode strip is farther away from or closer to the sub-area symmetry axis than the at least one of the first pixel electrode strips that the each first common electrode strip overlaps.

12. The manufacture method according to claim 11, wherein
the base substrate is arranged on a side of the common electrode that is away from the pixel electrode or on a side of the pixel electrode that is away from the common electrode.

13. The manufacture method according to claim 11, wherein
the first direction is parallel to a column direction of the plurality of pixel units that are arranged in an array.

14. The manufacture method according to claim 11, wherein
the pixel electrode further comprises at least one second pixel electrode strip that electrically connects the plurality of first pixel electrode strips, and the common electrode further comprises at least one second common electrode that electrically connects the plurality of first common electrode strips.

15. The manufacture method according to claim 11, wherein
each pixel unit comprises at least two pixel unit sub-areas, and each pixel unit has a pixel area symmetry axis extending in a row direction of the pixel units, and the at least two pixel unit sub-areas are symmetrically arranged with respect to the pixel area symmetry axis.

16. The array substrate according to claim 8, wherein
an extending direction of the first pixel electrode strips and an extending direction of the first common electrode strips are parallel to a row direction of the plurality of pixel units that are arranged in an array.

17. The array substrate according to claim 16, wherein
each of the first common electrode strips overlaps one of the first pixel electrode strips, and in the pixel unit sub-area, on either side of the sub-area symmetry axis, each first common electrode strip is farther away from or closer to the sub-area symmetry axis than the first pixel electrode strip that the each first common electrode strip overlaps.

18. The array substrate according to claim 17, wherein
the pixel electrode further comprises at least one second pixel electrode strip that electrically connects the plurality of first pixel electrode strips, and
the common electrode further comprises at least one second common electrode strip that electrically connects the plurality of first common electrode strips.

19. The array substrate according to claim 18, wherein
each pixel unit comprises at least two pixel unit sub-areas, and each pixel unit has a pixel area symmetry axis extending in a row direction of the pixel units, and the at least two pixel unit sub-areas are symmetrically arranged with respect to the pixel area symmetry axis.

20. An array substrate, comprising:
a base substrate, and a plurality of pixel units that are arranged in an array on the base substrate, wherein each of the pixel units comprises:
a pixel electrode, wherein the pixel electrode comprises a plurality of first pixel electrode strips and a plurality of first slits that are arranged between adjacent first pixel electrode strips, and the plurality of first pixel electrode strips are arranged substantially in parallel in a first direction;
a common electrode that is arranged in a different layer from the pixel electrode, wherein the common electrode comprises a plurality of first common electrode strips and a plurality of second slits that are arranged between adjacent first common electrode strips, and the plurality of first common electrode strips are arranged substantially in parallel in the first direction,
wherein each of the first common electrode strips overlaps at least one of the first pixel electrode strips;
each pixel unit comprises at least one pixel unit sub-area, the pixel unit sub-area has a sub-area symmetry axis, the first pixel electrode strips of the pixel electrode in the pixel unit sub-area are arranged with respect to the sub-area symmetry axis symmetrically, and the first common electrode strips of the common electrode in the pixel unit sub-area are arranged with respect to the sub-area symmetry axis symmetrically,
in the pixel unit sub-area, on either side of the sub-area symmetry axis, each first common electrode strip is farther away from or closer to the sub-area symmetry axis than the at least one of the first pixel electrode strips that the each first common electrode strip overlaps;
a number of the plurality of first pixel electrode strips of the pixel electrode is larger than a number of the plurality of first common electrode strips of the common electrode.

* * * * *